US010339307B2

(12) United States Patent
Dabosville et al.

(10) Patent No.: US 10,339,307 B2
(45) Date of Patent: Jul. 2, 2019

(54) INTRUSION DETECTION SYSTEM IN A DEVICE COMPRISING A FIRST OPERATING SYSTEM AND A SECOND OPERATING SYSTEM

(71) Applicant: OBERTHUR TECHNOLOGIES, Colombes (FR)

(72) Inventors: Guillaume Dabosville, Colombes (FR); Michele Sartori, Colombes (FR)

(73) Assignee: IDEMIA FRANCE, Colombes (FR)

( * ) Notice: Subject to any disclaimer, the term of this patent is extended or adjusted under 35 U.S.C. 154(b) by 322 days.

(21) Appl. No.: 15/032,098

(22) PCT Filed: Oct. 27, 2014

(86) PCT No.: PCT/FR2014/052730
§ 371 (c)(1),
(2) Date: Jun. 9, 2016

(87) PCT Pub. No.: WO2015/063405
PCT Pub. Date: May 7, 2015

(65) Prior Publication Data
US 2016/0335433 A1 Nov. 17, 2016

(30) Foreign Application Priority Data
Oct. 28, 2013 (FR) ...................... 13 60499

(51) Int. Cl.
G06F 21/00 (2013.01)
G06F 21/55 (2013.01)
(Continued)

(52) U.S. Cl.
CPC ............ G06F 21/552 (2013.01); G06F 21/74 (2013.01); H04L 9/0618 (2013.01)

(58) Field of Classification Search
None
See application file for complete search history.

(56) References Cited

U.S. PATENT DOCUMENTS 7,502,674 B2 * 3/2009 Okude .................. G06F 9/4843
701/1
7,765,374 B2 * 7/2010 Field ...................... G06F 9/468
711/163

(Continued)

FOREIGN PATENT DOCUMENTS

EP 1 918 841 A2 5/2008

OTHER PUBLICATIONS

Johannes Winter: "Trusted computing building blocks for embedded linux-based ARM trustzone platforms", Proceedings of the 3rd ACM Workshop on Scalable Trusted Computing, STC '08, Oct. 31, 2008 (Oct. 31, 2008), pp. 21-30, XP055117999, New York, New York, USA DOI: 10.1145/1456455.1456460 ISBN: 978-1-60-558295-5 figure 1.

(Continued)

Primary Examiner — Maung T Lwin
(74) Attorney, Agent, or Firm — Young & Thompson

(57) ABSTRACT

Intrusion detection systems dedicated to an operating system, and an intrusion detection system in a device implementing at least a first operating system and a second operating system are provided. The intrusion detection systems includes: a listening module configured to be executed in the first operating system in order to listen to the activity of this first operating system; a collecting module configured to be executed in the first operating system in order to collect data characterizing the activity of the first operating system; and an analysis and detection module configured to be executed in the second operating system in order to analyze the data collected in the first operating system and detect a suspicious activity in the first operating system depending on the analysis.

17 Claims, 2 Drawing Sheets

(51) Int. Cl.
*G06F 21/74* (2013.01)
*H04L 9/06* (2006.01)

(56) References Cited

U.S. PATENT DOCUMENTS

| | | | | |
|---|---|---|---|---|
| 8,296,844 B2* | 10/2012 | Bogner | ............... | G06F 21/554 |
| | | | | 726/22 |
| 2003/0236992 A1 | 12/2003 | Yami | | |
| 2005/0091558 A1* | 4/2005 | Chess | ............... | G06F 21/53 |
| | | | | 714/38.13 |
| 2007/0150893 A1* | 6/2007 | Grobman | ............ | G06F 1/3203 |
| | | | | 718/1 |
| 2009/0031421 A1* | 1/2009 | Lee | ............... | G06F 21/552 |
| | | | | 726/23 |
| 2009/0044265 A1 | 2/2009 | Ghosh et al. | | |
| 2010/0024035 A1* | 1/2010 | Wallace | ............ | G06F 21/554 |
| | | | | 726/25 |
| 2011/0055925 A1 | 3/2011 | Jakobsson | | |
| 2014/0337918 A1* | 11/2014 | Siddiqi | ............... | G06F 21/56 |
| | | | | 726/3 |
| 2015/0007316 A1* | 1/2015 | Ben-Shalom | ....... | H04L 63/1416 |
| | | | | 726/23 |
| 2015/0052614 A1* | 2/2015 | Crowell | ............... | G06F 21/53 |
| | | | | 726/25 |

OTHER PUBLICATIONS

Jing Luo et al.: "Design and implementation of security OS based on TrustZone", 2013 IEEE 11th International Conference on Electronic Measurement & Instruments, IEEE, vol. 2, Aug. 16, 2013 (Aug. 16, 2013), pp. 1027-1032, XP032569158, DOI: 10.1109/ICEMI.2013.6743208 ISBN: 978-1-4799-0757-1 [retrieved on Feb. 18, 2014] section III.

International Search Report, dated Feb. 10, 2015, from corresponding PCT application.

* cited by examiner

INTRUSION DETECTION SYSTEM IN A DEVICE COMPRISING A FIRST OPERATING SYSTEM AND A SECOND OPERATING SYSTEM

FIELD OF THE INVENTION

The invention concerns the field of intrusion detection systems dedicated to an operating system and more particularly an intrusion detection system in a device employing at least two operating systems.

BACKGROUND OF THE INVENTION

An intrusion detection system offers means for detecting the suspicious activity of an operating system employed on a device. A number of types of activities or intrusions can be detected, such as intrusions compromising the confidentiality of data such as the theft of data or seeking data the existence of which is not necessarily known to the attacker, intrusions compromising the integrity of data such as the illicit modification of data or the introduction of malware, or intrusions compromising the availability of data or services such as the illicit destruction of data or the illicit modification of the rights of access of the users of the device to data or services.

These means for detecting the suspicious activity are notably useful for identifying the attackers and the modifications carried out and also for determining the necessary corrections of the software modules ensuring the security of the operating system so as to limit future intrusion.

The detection of the suspicious activity of a system is generally the result of the analysis of the behavior of that system and more particularly of the analysis of the events generated by the applications and processes of that system. As the quantity of data to be analyzed can be large, automatic analysis methods are employed. There exists a plurality of approaches to detecting the suspicious activity of an operating system.

A first or behavioral approach is founded on the principle that the exploitation of a vulnerability of the system leads to an abnormal behavior of the system. That approach is initially described in the paper by J. P. Anderson, "Computer Security Threat Monitoring and Surveillance", ACM, 1980. Such behavior corresponds for example to a large number of unsuccessful connection attempts or to an abnormal use of certain resources of the system. Statistical methods may be used to characterize normal and abnormal behaviors of the system. Of those methods, the Denning model characterizes the behavior of a system notably as a function of the user of the system, the resources of the system, the actions of the user on the resources of the system, the usual behavior of the user of the system or records logging abnormal activities of the system. The behavior of a system can also be characterized by a set of logical rules applied by an expert system, for example, or by detected system event classification methods.

A second or scenario-based approach defines the behavior of an attacker with the aid of a set of rules. That approach is described for example in the paper by Paul Helman, Gunar Liepins, and Wynette Richards "Foundations of Intrusion Detection", IEEE Computer Security Foundations Workshop, 1992. That approach can detect only scenarios that have been formalized. Note that, for example, it is implemented either by an expert system notably including a set of logical rules defining the security policy of the system and a set of logical rules defining the vulnerabilities of the system or by genetic algorithms.

However, these intrusion detection systems can be inhibited by an attacker or malware having sufficient access rights. This risks leading to the partial or total deactivation of the intrusion detection system.

In this case, the known solutions do not offer sufficient security since they do not make it possible to detect that an intrusion detection system has been deactivated, for example in order to reactivate it. The attacker or the malicious program is then in a position to carry out attacks exploiting the vulnerabilities previously referred to without the system being in a position to detect them.

SUMMARY OF THE INVENTION

The object of the present invention is therefore to alleviate at least one of the above drawbacks.

In this context, a first aspect of the invention concerns a system for detecting intrusion in a device including a first operating system and a second operating system, the intrusion detection system including a listening module configured to be executed in the first operating system in order to listen to the activity of this first operating system and a collecting module configured to be executed in the first operating system in order to collect data characterizing the activity of the first operating system
characterized in that said intrusion detection system includes an analysis and detection module configured to be executed in the second operating system in order to analyze the data collected in the first operating system and to detect a suspicious activity in the first operating system as a result of said analysis.

On a device including a plurality of operating systems, a plurality of embodiments are envisaged: either the two operating systems function in parallel, for example thanks to the use of a processor with multiple cores, in other words a processor having at least two physical cores that work in parallel, or the two operating systems function at the same time, but while one of them is executing the other is dormant. In this case, their executions are said to be mutually exclusive.

A switching mechanism is provided to make it possible to switch from one operating system to the other in the event of exclusive executions or to notify the second operating system of the need to analyze the data collected if the two operating systems are executed in parallel.

The mechanism for switching from a first operating system to the second operating system, one possible implementation of which is described hereinafter, is used by a switching module which may be independent of the operating systems or not.

In a correlative way, a second aspect of the invention concerns a method for detecting a suspicious activity in a device including a first operating system and a second operating system, the intrusion detection method including a step of listening in the first operating system to listen to the activity of that first operating system and a collecting step in the first operating system to collect data characterizing the activity of the first operating system,
characterized in that the method of detecting a suspicious activity includes: an analysis and detection step in the second operating system for analyzing the data collected in the first operating system and detecting a suspicious activity in the first operating system as a result of said analysis.

A third aspect of the invention concerns a device including a first operating system and a second operating system, said device including an intrusion detection system as defined above.

The invention therefore makes it possible to prevent deactivation of the intrusion detection system and more precisely the analysis of the collected activity data and the possible detection of an intrusion by an attacker or malware in order that its activity becomes transparent, for example for the user of the device.

The invention prevents deactivation of the intrusion detection system by dividing the monitoring and intrusion detection process between at least two operating systems. In particular, the invention segments the intrusion detection system into a plurality of modules, some of which are associated with the first operating system being monitored in order to collect the data characterizing its own activity and one or more others of which are associated with the second operating system in order to analyze the collected data, the second operating system by definition hosting no malware. The second operating system therefore makes it possible to detect a possible intrusion during the execution of the first operating system being monitored without malicious deactivation of those analysis and detection modules being possible.

Other features of the system, the device and the method for detecting a suspicious activity in accordance with embodiments of the invention are defined in the dependent claims.

In accordance with one particular feature, the collecting module stores said data in a buffer memory of said first operating system, said buffer memory being accessible in read mode by the second operating system.

In a correlative way, the collecting step includes storing said data in a buffer memory of the first operating system, the buffer memory being accessible in read mode by the second operating system.

The buffer memory is of the queue type. The data characterizing the activity of the first operating system is analyzed by an analysis module of the trusted operating system. A switching mechanism, one possible implementation of which is described hereinafter, is employed in order for the analysis to be possible. However, excessively frequent switching from one operating system to another would have the consequence of reducing the performance of the operating system. If the operating systems are executed exclusively of each other, the use of the buffer memory to store activity data over a shorter or longer period therefore makes it possible to reduce the frequency of switching from the first operating system to the second operating system in order for it to be able to analyze the activity of the first operating system. If the operating systems are executed in parallel, the use of a buffer memory to store activity data over a shorter or longer period makes it possible to reduce the frequency of execution of the process of the second operating system dedicated to the analysis of the activity of the first operating system.

In accordance with one particular embodiment of the invention, the switching module is configured to trigger switching from the first operating system to the second operating system when the memory capacity used by said buffer memory reaches a predefined value or after a predetermined time or after a triggering action by the user of the device.

In a correlative way, the switching step is triggered when the memory capacity used by the said buffer memory reaches a predefined value or after a predetermined time or after a triggering action by the user of said device.

This arrangement defines a plurality of possible switching conditions.

It is to be noted that the switching step is triggered after the switching module has itself generated a switching instruction, for example. In fact, the switching module, which can be independent of the operating systems, has a timer. That timer counts down the time elapsed since the last switching from the first operating system to the second operating system. The switching module can trigger switching to the second operating system after a predetermined time. The regular triggering of the switching module in accordance with this embodiment offers the advantage of preventing a denial of service attack executed by an attacker or malware.

In accordance with one particular embodiment of the invention, the analysis module is configured to verify, for data relating to the activity of the first operating system, compliance with data access rights depending on a set of rules stored in a non-volatile memory of the device that can be accessed by the second operating system.

In a correlative way, the analysis step includes, for data relating to the activity of the first operating system, the verification of compliance with access rights depending on a set of rules stored in a non-volatile memory of the device that can be accessed by the trusted operating system.

In accordance with one particular feature, the buffer memory is secured by an encryption process.

Malware or an attacker could attempt to modify the content of the buffer memory, for example by inserting in it new data that does not necessarily correspond to the real activity of the first operating system or by deleting data previously stored in the buffer memory. This particular feature notably offers the advantage of being able to detect possible violation of the integrity of the buffer memory during the analysis of the data by the analysis module of the second operating system.

In accordance with one particular feature, the first operating system and the second operating system are executed exclusively of each other.

In other words, the operating systems can function at the same time but when one of them is in an active mode the other is in an inactive mode. A switching mechanism, one possible implementation of which is described hereinafter, makes it possible to switch from one operating system to another.

In one embodiment, the second operating system conforms to the Trusted Execution Environment (TEE) Protection Profile standard version 1.0 defined by the GlobalPlatform Organization.

In accordance with another embodiment, the second operating system includes means for encrypting the buffer memory that can be accessed by the second operating system.

In accordance with a further embodiment, the second operating system includes means for monitoring its programming interfaces to protect itself against software attacks originating from the first operating system.

In accordance with a further embodiment, when it is executed, the second operating system has a right of access to all the resources of said device.

In one particular embodiment, the various steps of the method of detecting a suspicious activity are determined by computer program constructions.

The invention is therefore also directed to a computer program on an information medium including instructions for executing a method as referred to above of detecting a suspicious activity when it is loaded and executed by a processor.

That program may use any programming language and take the form of source code, object code or an intermediate code between source code and object code, such as a partially compiled form, or any other desirable form.

If the invention is also directed to a computer-readable information medium including instructions of a computer program as referred to above.

The information medium may be any entity or device capable of storing the program. For example, the medium may comprise a storage medium, such as a ROM, for example a CD ROM or a solid state ROM, or a magnetic storage medium, for example a diskette (floppy disk), a hard disk or a flash memory.

Moreover, the information medium may be a transmissible medium such as an electrical or optical signal that can be routed via an electrical or optical cable, by radio or by other means. The program in accordance with the invention may in particular be downloaded onto a storage platform of an Internet type network.

Alternatively, the information medium may be an integrated circuit incorporating the program, the circuit being adapted to execute or to be used in the execution of the method in question.

The aforementioned information medium and computer program have features and advantages analogous to those of the method that they implement.

BRIEF DESCRIPTION OF THE FIGURES

Other particular features and advantages of the invention will become more apparent in the course of the following description, illustrated by the appended figures that illustrate embodiments thereof having no limiting character. In the figures.

DETAILED DESCRIPTION OF THE INVENTION

Generally speaking, the invention concerns the detection of the suspicious activity of a first operating system by a second operating system, the two operating systems being used on the same device.

Figure 1:
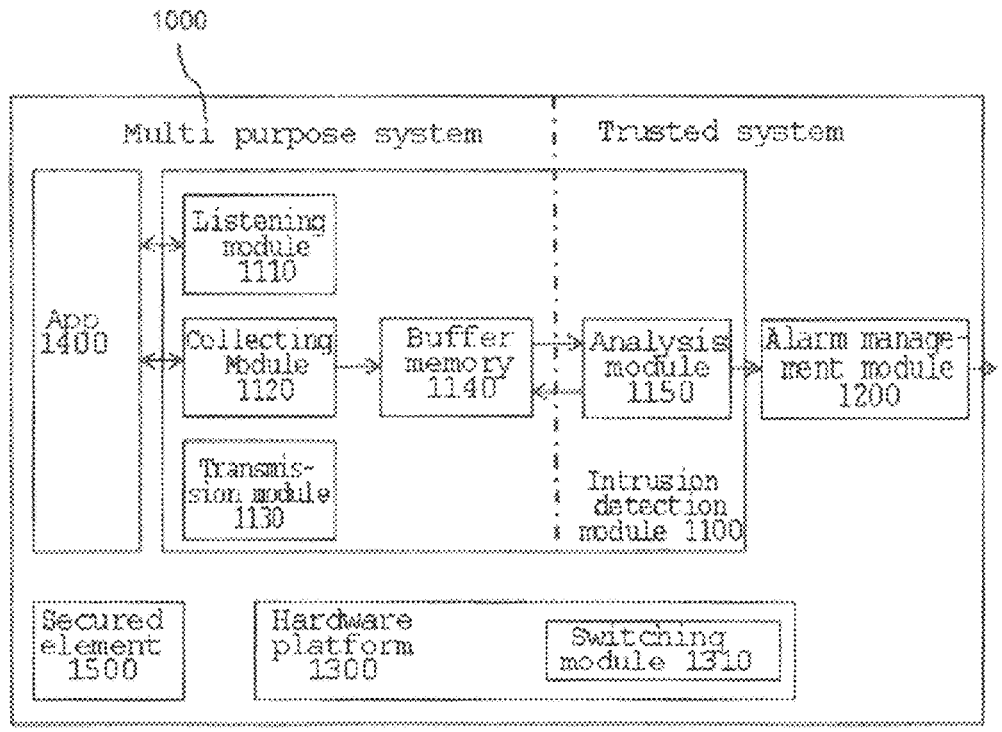
FIG. 1 illustrates an example of software architecture for a device including an intrusion detection module in accordance with one particular embodiment of the invention.

FIG. 1 represents a device 1000 in accordance with the invention including an intrusion detection module 1100 in accordance with the invention adapted to implement the principal steps of a method in accordance with the invention of detecting a suspicious activity as described hereinafter with reference to FIG. 2.

The device 1000 may be a mobile telephone, for example, a tablet, a microcomputer or an autonomous intelligent system capable of communicating with other remote systems without human intervention.

The device 1000 includes at least two operating systems. The first or "general purpose" operating system is designed to offer a large number of functionalities to a user of the device. The memory capacity and the performance of the first operating system are generally greater than those of the second operating system. Android, Windows, BlackBerry OS and Mac OS (trade names) are examples of general purpose operating systems.

The second operating system is sometimes referred to as a "trusted operating system". By trusted operating system is meant an operating system protected against software attacks and in which only applications sourced from accredited suppliers are installed and executed. A trusted operating system is in a position to monitor securely its programming interfaces (application programming interfaces) to protect it against software attacks originating from the first operating system. It conforms, for example, to the TEE Protection Profile standard version 1.0 defined by the GlobalPlatform organization and includes means for encrypting the memory that is dedicated to it. The trusted operating system has a right of access to all the resources of the device on which it is executed.

Each operating system is associated with an execution environment, referred to as general purpose in the case of the general purpose operating system and as trusted in the case of the trusted operating system. On starting up the device a launching program usually stored in ROM type non-volatile memory proceeds to launch the trusted operating system and then, if the latter launch is executed successfully, to launch the general purpose operating system. The starting mechanism generally corresponds to a sequence of steps and the correct execution of one step is a condition for the execution of the next. During a step relating to launching the general purpose operating system, the integrity of the code executed by the device is verified by the trusted operating system that has already been launched, for example with the aid of a fingerprint verification process generated by a hashing function. All of these steps make it possible to start up the device.

The two execution environments may be hosted on the same electronic component (chip set) and share hardware resources or be provided with dedicated hardware resources. The electronic component incorporates the TrustZone technology developed by ARM, for example, and notably described in the document "ARMv7-M Architecture Reference Manual". By resource is notably meant volatile and non-volatile memories and the processor or a data bus.

A processor may for example be provided with a monitored trusted zone dedicated to the trusted operating system and a general purpose zone dedicated to the general purpose operating system. The volatile and non-volatile memories may be memories dedicated to each operating system, but some zones of the non-volatile memory may be shared in read/write mode by the two operating systems or at least be accessible at least in read mode by the other operating system.

The trusted operating system and the general purpose operating system co-exist on the same device 1000 but may be executed in a mutually exclusive manner.

The device 1000 therefore includes a switching module 1310 notably responsible for effecting the switching from one operating system to the other and vice versa as described hereinafter.

The device 1000 may also include a secure element. A secure element takes the form for example of a removable microcircuit card or an onboard microcircuit soldered into the device but separate from the main processor of the device. A secure element generally complies with ISO/IEC 7816, to the common Criteria standards and/or to the "GlobalPlatform Card Specification v 2.2.1". It offers strong hardware and software security, as defined in those same standards, for example.

The device 1000 includes an intrusion detection module 1100 including a listening module 1110, a collecting module 1120, a transmission module 1130 and means for accessing the data stored in the buffer memory (not represented, for example a pointer to the memory address of the buffer memory) that are administered and therefore executed by the general purpose operating system and an analysis module 1150 that is administered and therefore executed by the trusted operating system.

Various activities relating to an operating system, the general purpose operating system in this example, are audited and then collected. This refers for example to some or all of the information characterizing access to the operating system. In particular the identity of the user of the device or processes, the time and date of access, the mode of access (local or remote) or the location of the user of the device or of the remote terminal accessing the operating system; information on the use of the system, in particular on the utilization of commands, access to inputs/outputs, the level of use of the processor, the level of occupation of the memory, or information characterizing the use of the data, in particular the date and time of access, the type of access such as modification or deletion and the identity of the user of the device or the processes; dynamic information that concerns operating system events such as launching and stopping processes and the data accessed or generated or that characterizes the evolution of the circulation of data between different storage and organization media, for example the files or memory registers managed by the system. Finally, this may also refer to information characterizing a possible security policy violation, in particular an attempt to execute an application necessitating privileged access rights, an attempt to launch commands necessitating privileged access rights, or the modification of data access rights.

Data characterizing the activity of the general purpose operating system may be collected by the general purpose operating system itself. There is then an event log, this term designating the sequential recording of the activity of the operating system. Alternatively, the source code of applications 1400 executed by the general purpose operating system or forming part thereof may be modified in order for instructions or events to be generated at the time of their execution. The data collected is stored in a buffer memory 1140. That memory is ideally a non-volatile memory managed (i.e. with read/write rights) by the general purpose operating system and accessible in read mode by the trusted operating system. Alternatively, a non-volatile memory is used that is shared in read/write mode between the general purpose operating system and the trusted operating system.

Embodiments of the invention use encryption when storing data in the buffer memory 1140. By encryption is meant a process making it possible to verify that the integrity and even the confidentiality and the authenticity of the buffer memory 1140 are preserved.

In accordance with a first particular embodiment, the buffer memory 1140 is encrypted in accordance with a symmetrical encryption method. This is a block encryption method, for example, using the Advanced Encryption Standard or Data Encryption Standard algorithm. The data in the buffer memory 1140 is divided into blocks, generally of fixed size, that are encrypted one after the other. Stream encryption may equally be used, which offers the advantage of processing large amounts of data, regardless of length. A linear feedback shift register that supplies a linear recurrent sequence may be used to implement this stream encryption. The encryption key is preferably an ephemeral key generated by the secure element 1500 or the trusted operating system, which may for example be stored in a memory of the trusted operating system or in the non-volatile memory of the secure element 1500. Alternatively, this key can be generated by the general purpose operating system.

When this symmetrical key is generated by a first operating system, it must be shared with the second operating system in order to enable access to the data collected and stored in the shared memory. The first operating system therefore sends the key to the switching module 1310 in order for it to store it in a memory with a view to sending it to the second operating system. In this way, the second operating system can use this encryption key afterwards to access in clear the data stored in the shared memory. Alternatively, the encryption key is stored in a shared memory located at a predetermined address known to the second operating system.

In accordance with a second particular embodiment, the buffer memory 1140 is encrypted in accordance with an asymmetrical encryption method. The trusted operating system is provided with a private key and a public key, the latter being known to the general purpose operating system. The data in the buffer 1140 is encrypted by the general purpose operating system using this public key, which is stored in the non-volatile memory of the general purpose operating system, for example.

In accordance with a third particular embodiment, the buffer memory 1140 is signed in order to guarantee its integrity. The general purpose operating system is provided with a private key and the data stored in the buffer memory 1140 is signed using that private key. The private key is ideally stored in the non-volatile memory of the secure element 1500. For its part, the trusted operating system is provided with the corresponding public key in order to be able to verify the signature.

One of the first two particular embodiments described above (asymmetric or symmetric key) may be combined with the third embodiment in order that confidentiality, authenticity and integrity can be jointly achieved.

If the two execution environments are executed in an exclusive manner, switching from the general purpose operating system to the trusted operating system makes it possible to trigger the analysis of the data collected and stored in the buffer memory 1140. Switching is managed by the switching module 1310 which in the architecture shown in FIG. 1 is independent of the operating systems. This is the case for example when the switching module 1310 is executed in the "TrustZone" as defined in the document "ARMv7-M Architecture Reference Manual".

Alternatively, the switching module 1310 is either shared between the two execution environments or managed by only one of them, conventionally the general purpose operating system.

In accordance with a first embodiment, the switching to the trusted operating system is initiated by the user, for example via an application 1400 accessible via the graphical user interface of the general purpose operating system. The interaction with the user of the device 1000 initiates the sending of an instruction to the switching module 1310 that triggers the mechanism for switching from the general purpose operating system to the trusted operating system.

In accordance with a second embodiment, the transmission module 1130 is capable of determining the level of occupation of the buffer memory 1140. Alternatively, the transmission module 1130 receives an instruction from a process administering the buffer memory when that level of occupation is reached. When a predefined threshold value is reached, the transmission module 1130 sends the switching module 1310 an instruction that triggers the mechanism for switching to the trusted operating system described above.

In accordance with a third embodiment, the switching module is triggered after a predetermined time. The switching module 1310 is preferably independent of the operating systems of the device 1000. It may be implemented at the level of a hardware platform 1300. The switching module 1310 is capable of managing a timer that counts the time elapsed since the last switching from the trusted operating system to the general purpose operating system. When that time has elapsed, the switching module 1310 triggers the mechanism for switching to the trusted operating system described above. This latter embodiment is particularly advantageous because it makes it possible to prevent a denial of service attack by an attacker or malware.

For each of the three embodiments described above, when the switching condition or conditions are met the transmission module 1130 sends the switching module 1310 the address of the buffer memory 1140 (for example a pointer to a self-portion of the memory of greater size than the buffer memory) in order for it to store it in a memory with a view to sending it to the trusted operating system. In this way, the analysis module can subsequently access this buffer memory 1140. Alternatively, the buffer memory is a shared memory located at a predetermined address known to the analysis module 1150 and in this case it is no longer necessary to send the address of the buffer memory 1140.

When the two execution environments are executed in parallel, for example thanks to the use of a multiple-core processor, the step of switching from a first execution environment to a second execution environment corresponds to a step of notification of the general purpose operating system that triggers the analysis of the data stored in the buffer memory 1140, for example by the instruction SMC defined below. The same triggering events as described above may be used.

Following the execution of one of the embodiments described above, the analysis module 1150 is launched. When the buffer memory is a shared memory located at an address known to the analysis module 1150, the latter accesses it directly. Otherwise the switching module 1310 that has previously stored the value of the address of the buffer memory 1140 sends it to the analysis module 1150. The analysis module 1150 accesses the buffer memory 1140 with the aid of this transmitted address value and if necessary verifies the signature associated with the data and decrypts that data.

The analysis module 1150 may optionally perform a statistical analysis linking the occupation of the buffer memory 1140 and the time elapsed since the last analysis. This statistical analysis offers a way to detect if an attacker or malware has carried out a denial of service attack, for example by blocking the listening module 1110 or the collecting module 1120. The data is thereafter analyzed, for example using one of the known methods described above.

When the two execution environments are executed in an exclusive manner and no suspicious activity is detected following the analysis, the analysis module sends the switching module 1310 an instruction that triggers the reverse switching by the switching mechanism, i.e. switching from the trusted operating system to the general purpose operating system, for example the instruction SMC defined below.

For example, for data relating to the activity of the first operating system, the analysis includes the verification of compliance with rights of access depending on rules. Each item of data, for example each file, directory or executable process, is associated with at least one item of metadata, for example named "itag", which characterizes the content of that data item. This metadata may be stored either in the buffer memory or in a non-volatile memory of the first operating system directly accessible by the analysis module during the analysis of the data stored in the buffer memory. This metadata is updated after each transfer of information. A security policy corresponding to a set of access rules and named "ptag" may also be associated with each item of data. An intentionally simplified scenario for implementing this analysis is described below: a first file "File 1" is labeled "Green". In other words, Itag(File 1)=Green. A second file "File 2" is labeled "Red". In other words, Itag(File 2)=Red. In accordance with one of the rules associated with the second file "Write(Green→Red)=prohibited". If the content of the file "File 1" is copied into "File 2", then application of the rule will have the consequence of triggering a positive detection indication sent to an alarm management module 1200.

Another example of verification may be based on the value of certain data manipulated in order to ensure that it does not take prohibited values.

Another example of verification may be based on the evolution of the access rights associated with the manipulated data.

When a suspicious activity is detected, the positive detection indication is sent to an alarm management module 1200 which can then trigger local countermeasures such as deactivating an application, stopping a process of the trusted operating system, partial or total deactivation of access to communication networks, modification of rights of access to a user or a process, or execution of a stronger authentication process. The indication may also be sent to a remote server (not shown), for example a server administered by a mobile telephone operator, in order for it to be able to detect that an attack on a fleet of devices is in progress. The remote server is then in a position to trigger global countermeasures such as deactivating an application, stopping a process of the trusted operating system, partial or total deactivation of access to communication networks for a set of devices, or deactivation of a service offered by the server in order notably to avoid a distributed attack.

Figure 2:
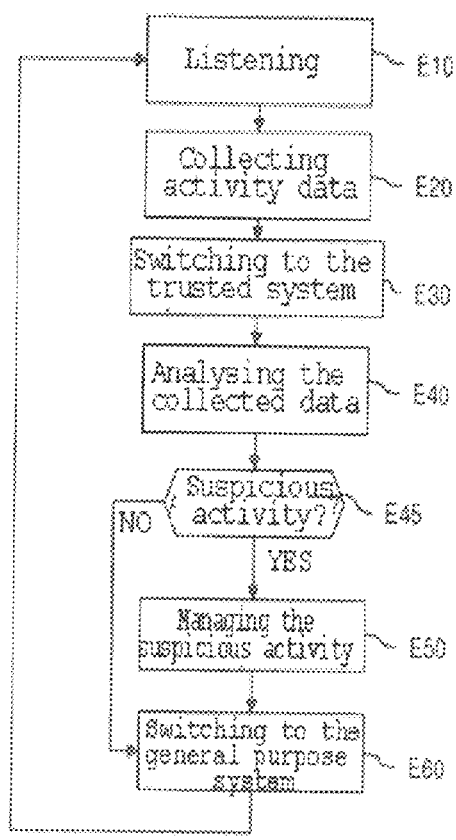
FIG. 2 illustrates general steps of a method in accordance with the invention of detecting a suspicious activity.

FIG. 2 shows an algorithm of one embodiment of a method conforming to the teachings of the invention.

During a first step E10 the module 1110 listens to the activity of the general purpose operating system being executed.

During a second step E20 the activities of the processes and applications of the general purpose operating system are collected. The data characterizing the activity of an operating system may be collected by the operating system itself. Alternatively, the source code of applications 1400 executed by the general purpose operating system or forming part of the latter may be modified in order for instructions or events to be generated at the time of their execution. The data collected is stored in the buffer memory 1140.

As described above, encryption is employed during the step of collecting data and storing it in the buffer memory 1140. By encryption is meant a process making it possible to verify that the integrity and even the confidentiality and the authenticity of the buffer memory 1140 are preserved.

A step E30 of switching from the general purpose operating system to the trusted operating system is effected in order that the analysis by the trusted operating system of the data collected and stored in the buffer memory 1140 may take place. Alternatively, when the two operating systems are executed in parallel, the switching step E30 corresponds to a step of notification of the trusted operating system.

Switching is notably triggered when a switching condition is met, as described above.

During a step E40 the collected data is analyzed. If necessary the signature associated with the data is verified and the data is decrypted. A statistical analysis linking the level of occupation of the buffer memory 1140 and the time elapsed since the last analysis is optionally carried out. This statistical analysis offers a way to detect if an attacker or malware has carried out a denial of service attack, for example by inhibiting the listening step E10 or the collecting step E20. The data is then analyzed, for example in accordance with one of the methods described above.

If no suspicious activity is detected (test E45) following the analysis, the mechanism for switching back to the general purpose operating system is triggered (E60).

Otherwise, during a step E50 local countermeasures are used such as deactivating an application, stopping a process of the trusted operating system, partial or total deactivation of access to communication networks, modification of rights of access to a user or a process, or a stronger authentication method. The indication of detection of a suspicious activity may also be sent to a remote server in order for it to be able to detect that an attack is in progress on a fleet of devices. The remote server is then a position to trigger global countermeasures such as deactivating an application, stopping a process of the trusted operating system, partial or total deactivation of access to communication networks, or deactivating a service offered by the server, notably in order to prevent a distributed attack. Switching back to the general purpose operating system (E60) follows the step E50.

After the switching back step E60, the method returns to the step E10, the general purpose operating system being active again.

Figure 3:
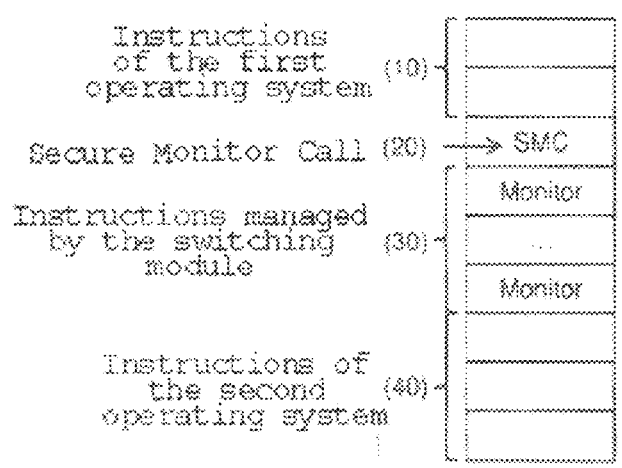
FIG. 3 illustrates an example of the state of the execution stack of a device including two operating systems after switching from one to the other.

FIG. 3 shows an example of the state of the execution stack of a device including two operating systems after switching from one to the other. One possible implementation of the switching mechanism is as follows: an instruction, in other words a message or an event, is received or generated by the switching module 1310. This instruction is generated after a user has interacted with the device via one of its interfaces or one of its peripherals, for example, after a predetermined time has elapsed, or after the size of the buffer memory 1140 has reached a predetermined value as described above. The switching module 1310, which is sometimes called a "monitor" or "scheduler", inserts a set of instructions into an execution stack common to the operating systems of the device.

In the FIG. 3 example, a set 10 of instructions interpreted sequentially is added to the execution stack by the first operating system. After receiving or generating the instruction described above, the switching module 1310 adds to this execution stack a first instruction, sometimes called "Secure Monitor Control" (SMC), responsible for triggering the switching mechanism (20).

The switching module then verifies which operating system has been executing until now, for example by determining the value of the Non Secure bit stored in the Secure Configuration Register the value of which is modified on switching between the two operating systems. The state of the first operating system is then saved in a non-volatile memory, an instruction is sent to the first operating system in order for the processes being executed to be made dormant, certain memories are emptied, and the hardware peripherals initially associated with the first execution environment are associated with the second execution environment. The second operating system, previously dormant, is woken up and its state is restored based on the last state saved for the second operating system. Finally, the value of the Non Secure bit is updated (30) to indicate that the second operating system is being executed. The second operating system can then add its own instructions (40) to the execution stack.

The foregoing examples are merely embodiments of the invention, which is not limited to them.

The invention claimed is:

1. A device comprising:
   a first operating system;
   a second operating system;
   intrusion detection system comprising:
      listening-executable instructions configured to be executed by one or more processors in the first operating system in order to listen to the activity of the first operating system,
      collecting-executable instructions configured to be executed by the one or more processors in the first operating system in order to collect data characterizing the activity of the first operating system, and
      analysis and detection-executable instructions configured to be executed by the one or more processors in the second operating system in order to analyze the data collected in the first operating system and to detect a suspicious activity in the first operating system as a result of said analysis; and
   one or more hardware processors configured to execute the first operating system, the second operating system, and the intrusion detection system,
   wherein the first operating system and the second operating system are executed exclusively of each other, and
   the second operating system conforms to a Trusted Execution Environment (TEE) Protection Profile version 1.0 defined by the GlobalPlatform Organization.

2. The device as claimed in claim 1, wherein the collecting-executable instructions store said data in a buffer memory of said first operating system, said buffer memory being accessible in read mode by the second operating system.

3. The device as claimed in claim 2, wherein the buffer memory is secured by an encryption method.

4. The device as claimed in claim 2, further comprising switching-executable instructions executable by the one or more processors and configured to trigger switching from the first operating system to the second operating system when the memory capacity used by said buffer memory reaches a predefined value or after a predetermined time or after a triggering action by a user of the device.

5. The device as claimed in claim 2, wherein the second operating system includes an encryption system configured to encrypt the buffer memory that is accessible by the second operating system.

6. The device as claimed in claim 2, wherein the buffer memory is a shared memory shared by the first operating system and the second operating system, the second operating system directly accessing the shared memory.

7. The device as claimed in claim 1, wherein the analysis and detection-executable instructions are configured to verify, for data relating to the activity of the first operating system, compliance with data access rights depending on a set of rules stored in a non-volatile memory of the device accessible by the second operating system.

8. The device as claimed in claim 1, wherein the second operating system includes a monitoring system configured to monitor programming interfaces of the second operating system to protect the second operating system against software attacks originating from the first operating system.

9. The device as claimed in claim 1, wherein, when the second operating system is executed, the second operating system has a right of access to all resources of said device.

10. The device as claimed in claim 1, wherein local countermeasures at the device are implemented in response to detecting the suspicious activity in the first operating system.

11. The device as claimed in claim 10, wherein the local countermeasures include deactivating an application, stopping a process of the second operating system, partially or totally deactivating access to communication networks, modifying rights of access to a user or a process, or conducting an authentication method.

12. A method for detecting a suspicious activity in a device including a first operating system, a second operating system, and an intrusion detection system, the intrusion detection method comprising:
listening in the first operating system to listen to the activity of the first operating system;
collecting data in the first operating system characterizing the activity of the first operating system; and
analyzing and detecting in the second operating system to analyze the data collected in the first operating system and detect a suspicious activity in the first operating system as a result of said analysis,
wherein the first operating system and the second operating system are executed exclusively of each other, and
the second operating system conforms to a Trusted Execution Environment (TEE) Protection Profile version 1.0 defined by the GlobalPlatform Organization.

13. The method of detecting a suspicious activity as claimed in claim 12, wherein the collecting includes storing said data in a buffer memory of the first operating system, said buffer memory being accessible in read mode by the second operating system.

14. The method of detecting a suspicious activity as claimed in claim 13, wherein the buffer memory is secured by an encryption method.

15. The method of detecting a suspicious activity as claimed in claim 13, further comprising switching, said switching being triggered when the memory capacity used by said buffer memory reaches a predefined value or after a predetermined time or after a triggering action by a user of the device.

16. The method of detecting a suspicious activity as claimed in claim 12, wherein the analyzing and detecting includes, for data relating to the activity of the first operating system, verification of compliance with data access rights depending on a set of rules stored in a non-volatile memory of the device accessible by the second operating system.

17. A non-transitory computer program product including instructions for causing one or more processors to execute an intrusion detection method in a device including a first operating system, a second operating system, and an intrusion detection system, when the program product is loaded and executed by a processor, the intrusion detection method comprising:
listening in the first operating system to listen to the activity of the first operating system;
collecting data in the first operating system characterizing the activity of the first operating system; and
analyzing and detecting in the second operating system to analyze the data collected in the first operating system and detect a suspicious activity in the first operating system as a result of said analysis,
wherein the first operating system and the second operating system are executed exclusively of each other, and
the second operating system conforms to a Trusted Execution Environment (TEE) Protection Profile version 1.0 defined by the GlobalPlatform Organization.

* * * * *